Figure 1:
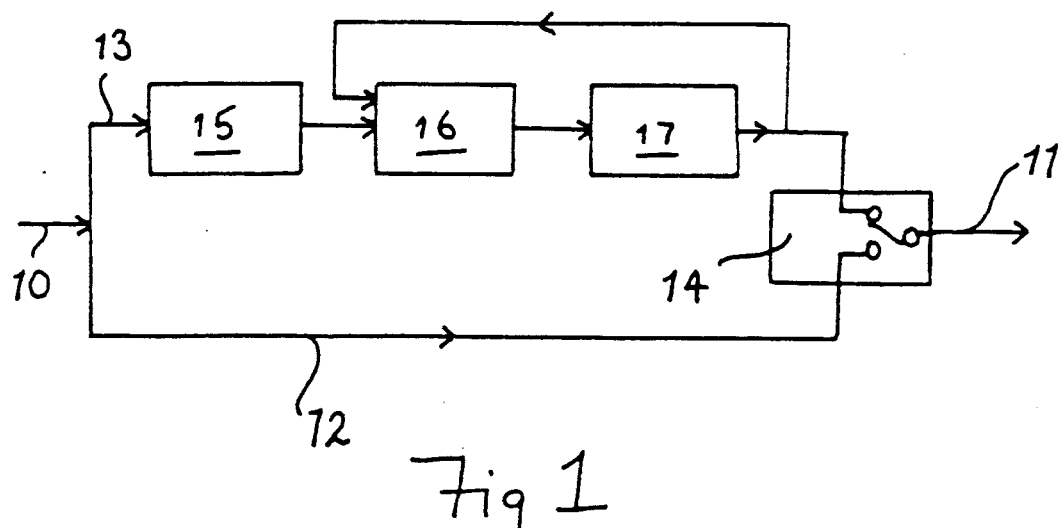

United States Patent [19]

Billing

[11] Patent Number: 5,067,133
[45] Date of Patent: Nov. 19, 1991

[54] ERROR-CORRECTION OF STORED TELEVISION SIGNALS

[75] Inventor: Robert Billing, Crowthorne, Great Britain

[73] Assignee: Questech Limited, Wokingham, United Kingdom

[21] Appl. No.: 377,832

[22] PCT Filed: Dec. 30, 1987

[86] PCT No.: PCT/GB87/00922

§ 371 Date: Aug. 18, 1989

§ 102(e) Date: Aug. 18, 1989

[87] PCT Pub. No.: WO88/05245

PCT Pub. Date: Jul. 14, 1988

[30] Foreign Application Priority Data

Dec. 30, 1986 [GB] United Kingdom ............... 8631027
Jun. 3, 1987 [GB] United Kingdom ............... 8713018

[51] Int. Cl.$^5$ .................. G06F 11/10; H04N 5/907
[52] U.S. Cl. ................................ 371/53; 371/21.5
[58] Field of Search ............ 358/160, 162, 163, 336, 358/314; 360/38.1, 53; 371/37.1, 37.3, 37.7, 40.2, 71, 40.1, 40.4, 41, 38.1, 37.4, 21.5, 53, 54

[56] References Cited

U.S. PATENT DOCUMENTS

| 3,586,842 | 6/1971 | Murayama | 371/53 |
| 4,495,623 | 1/1985 | George et al. | 371/37.4 |
| 4,586,183 | 4/1986 | Wilkinson | 371/38.1 |
| 4,607,290 | 8/1986 | Murakami | 358/260 |
| 4,607,367 | 8/1986 | Ive et al. | 371/37.4 |
| 4,612,640 | 9/1986 | Mehrotra et al. | 371/51 |
| 4,698,808 | 10/1987 | Ishii | 371/53 |
| 4,710,934 | 12/1987 | Traynor | 371/40.1 |
| 4,802,170 | 1/1989 | Trottier | 371/40.4 |
| 4,947,396 | 8/1990 | Shin | 371/54 |
| 4,979,174 | 12/1990 | Cheng et al. | 371/41 |

FOREIGN PATENT DOCUMENTS 0039565 11/1981 European Pat. Off. .
0102782 3/1984 European Pat. Off. .
0135255 3/1985 European Pat. Off. .

OTHER PUBLICATIONS

"Digital Audio Formats for Recording and Digital Communication", Doi et al, SMPTE Journal, Aug. 1981, pp. 669–677.

Glickstein, Weighted Checksum to Detect and Restore Altered Bit(s) in Computer Memory: IBM Technical Disclosure Bulletin, vol. 13, No. 10, Mar. 1971, pp. 3146–3147.

Primary Examiner—John W. Shepperd
Attorney, Agent, or Firm—Berman & Aisenberg

[57] ABSTRACT

Deterioration of the image as a result of failure of individual memory cells is avoided by storing, together with the data relating to each line of the image field, a code value computed as a function of the value of each data bit in the line and the position of each bit in the line. A picture signal stored in this way may be reproduced by transmitting each line signal to a function generator (15), adder (16) and accumulator (17) to re-compute a code value by the same function utilized during the storage of the signal, and applying the stored code value to a latch (21). The outputs of the accumulator (17) and latch (21) are applied to a subtracting circuit (25), and when the latter produces any output signal other than zero, the value of such signal will indicate both the position of any single faulty bit and the direction in which the stored value is in error.

8 Claims, 1 Drawing Sheet

ERROR-CORRECTION OF STORED TELEVISION SIGNALS

This invention concerns the storage of digital television signals in solid state random access memory chips.

A means for storing digital television signals in a solid state memory is described in co-pending Patent Application No. filed concurrently herwith.

It is known that in the storage of digital data in a random access solid state memory, deterioration of the stored data can occur as a result of failure of a memory cell to store the value of a data bit assigned thereto. Such failures may occur as a result of ambient atomic radiation which may cause a value stored in an individual cell to change in response to bombardment of the corresponding cell with an atomic particle. Normal levels of ambient radiation are such that errors of the kind described are infrequent, but when such an error occurs in a digital television image signal, the result can be a visible blemish in a reproduced picture image.

Accordingly it is an object of the present invention to provide means for overcoming this disadvantage.

The invention provides a method of storing a digital television picture image in a solid-state store, wherein a code is generated from the data contained in each line of the video raster, and a corresponding code value is stored in association with the data relating to each line of the picture signal, the code value being derived from the stored data in such a manner that an error occurring in any bit of the data relating to a given line, following storage thereof, can be detected by re-computing a code value from data retrieved from the store in relation to said line, and comparing the re-computed code value with that originally stored in relation to the same line. By providing that the algorithm utilised in computing the code value will provide not only an indication of an error, but also the location of the bit containing the error, means may be provided for correcting the error in any such data bit before the picture signal is reproduced.

Figure 2:
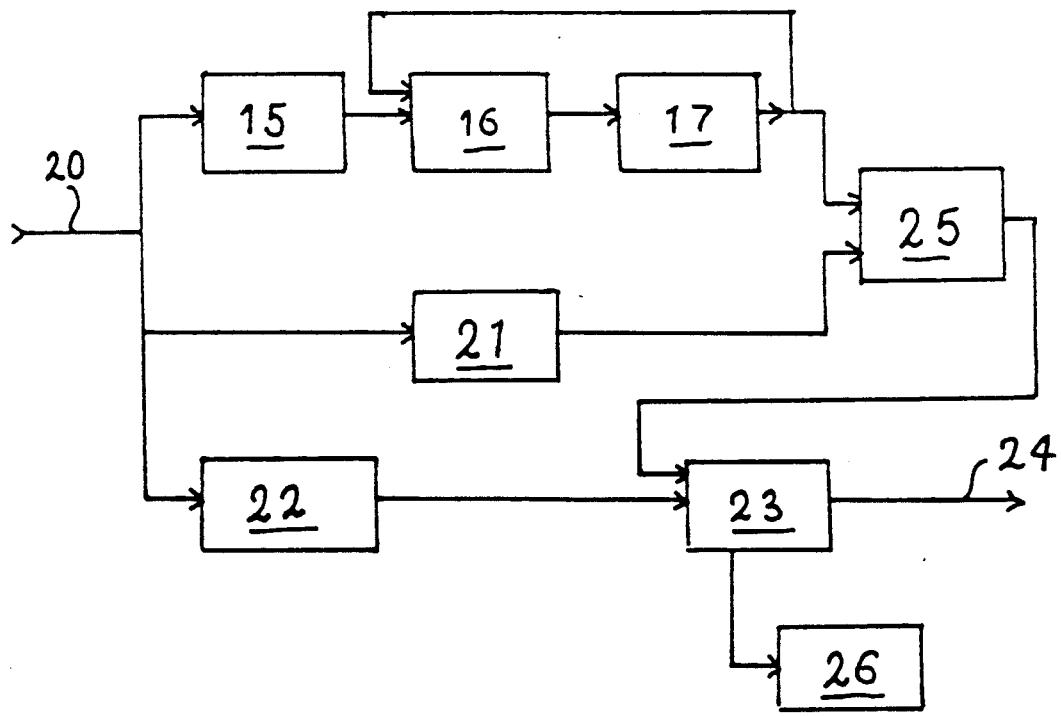

The invention is illustrated by way of example in the accompanying drawings, in which:

FIG. 1 is a block circuit diagram of a circuit for error check code generation, and FIG. 2 is a similar view of a circuit for error correction.

Referring to the drawings, the circuit of FIG. 1 includes an input 10 for receiving a sampled digital television picture signal and an output 11 for providing to a memory store a composite signal comprising the original picture signal and an accompanying error check code. The input 10 is coupled to the output 11 via two signal paths 12 and 13 that are optionally selectable via an electronic switch 14. the signal path 13 includes a function generator 15, an adder 16 and an accumulator 17, the latter receiving at its input the output of the adder 16 and providing at its output a signal coupled on the one hand to one side of the electronic switch 14 and on the other hand to an input of the adder 16, another input of which receives the output from the function generator 15. In the operation of the circuit of FIG. 1, the electronic switch 14 is arranged to couple the output 11 to the input 10 via the signal path 12 during the transmission of the data bits corresponding to each line of the digital television signal. Between consecutive lines of the signal, the switch 14 is actuated to couple the output 11 to the accumulator 17, so that the value provided at the output of the latter is inserted in the composite signal as an error check code. This code is generated by summing for every byte in the line a function that is provided by the function generator 15 and is the sum of every bit in the byte multiplied by the portion of that bit in the line. The first byte contains bits 1 to 8, the second 9 to 16 and so on. The summing is performed by the adder 16 and accumulator 17. In general the code value provided by the accumulator 17 will occupy about four bytes in the data stream.

In the writing of picture information into a memory store, two modes of operation are available, namely normal mode in which all of the picture data is written and long play in which only alternate fields of the original picture signal are written.

When picture image data including the code values provided by the circuit of FIG. 1 is read from the memory store, the error check codes are tested by a circuit as shown in FIG. 2, prior to reproduction and/or re-recording of the picture signal. This circuit comprises an input 20 arranged to receive the picture image information read from a store, for example in the manner described above, this input being coupled respectively to the input of an error check code generating circuit equivalent to that of FIG. 1, to the input of a latch 21 arranged to be actuated to receive and retain each error check code read from the store, and to the input of a delay circuit 22 for delaying the signal by the equivalent of one line of the television signal. The output of the delay circuit 22 is coupled via a restoring circuit 23 to an output 24. A subtracting circuit 25 is arranged to actuate the restoring circuit 23 in accordance with the relationship between the signals from the outputs of the accumulator 17 of the error check code regeneration circuit and the output of the latch 21. Thus, when data is read from the store it is first passed through the line store 22 which delays it while the error check code is tested. The error check code is regenerated and the value provided at the output of the accumulator 17 is subtracted from the error check code previously written into the data stream, by the subtractor 25. the code being held in the latch 21. If the result of the subtraction is zero then the data is correct, if not the absolute value of the difference is the bit number of the bit in error and the sign indicates the direction of the error. This number is passed to the restorer 23 which returns the faulty bit to its correct state. A counter 26 may be provided to record how often the restorer operates and can thus be used to measure the error rate of the store.

I claim:

1. A method of storing a digital television picture image in a solid state store comprising the steps of generating a code from the data contained in each line of the video raster and storing a code value corresponding to said code in association with the data relating to each line of the picture signal, the code value being derived from the stored data in such a manner that an error occurring in any bit of the data relating to a given line, following storage thereof, can be detected by re-computing a code value from data retrieved from the store in relation to said line and comparing the re-computed code value with that originally stored in relation to the same line, wherein said code value is derived by summing, for each byte of data in each line of the picture signal, the value of each bit multiplied by the position of that bit in the line.

2. A method of checking data stored by the method as claimed in claim 1, wherein a re-computed code value is derived from each line of stored data by summing, for each byte of data in each line of the picture signal, the value of each bit multiplied by the position of that bit in the line, and said re-computed code value is subtracted from the stored code value whereby any difference between said values provides an indication of the position in the line of a data error, and the sign of any such difference indicates the direction of the error.

3. A device for use in storing a digital television image signal comprising a signal input, a first signal path coupled to said signal input and containing means for deriving, from data corresponding to each line of the video raster, a code value that is a function of the value of each data bit and the position of each said data bit in the line and a accumulator for storing said code value, changeover switching means having a first input coupled to the output of said first signal path, a second input coupled directly to said signal input via a signal part, and an output for supplying data to a data store, said change over switching means being capable of actuation at the line repetition rate of said image signal whereby during receipt at said signal input of the data bits corresponding to each line of the input signal said signal image is connected to said output for supplying data to a data store via said second signal path and to said accumulator via said first signal path, whilst between consecutive lines of the image signal said accumulator is connected to said output for supplying data to a data store to insert said code value into the data stream.

4. A device as claimed in claim 3, wherein said means for deriving said code value comprises a function generator for providing, for each byte of a signal corresponding to an image line, a value corresponding to the sum of the products, for each bit of the byte, of the value of that bit multiplied by the position of that bit in the line, and an adder having a first input coupled to the output of said function generator a second input coupled to the output of said accumulator and an output coupled to the input of said accumulator.

5. A device for retrieving an image signal from a data store comprising a device as claimed in claim 3 or 4 and further comprising a decoding device comprising a third signal path equivalent to said first signal path and having an input for receiving data from a data store and means for recomputing for each line signal a second code value, a fourth signal path containing a latch arranged to receive a previously stored code value associated with each line signal from said input for receiving data from a data store, and a comparator coupled to the outputs of said third and fourth signal paths.

6. A device a claimed in claim 6 when appended to claim 4, wherein said comparator comprises a subtracting circuit arranged to subtract the code value provided by one signal path from that provided by the other.

7. A device as claimed in claim 6, wherein said decoding device further comprises a fifth signal path comprising a delay line providing a delay corresponding to one line of the image signal, and a restoring circuit coupled to the output of said delay line, said restoring circuit having a control input coupled to the output of said subtracting circuit and being arranged to alter the value of an individual bit of a line signal determined by the value at the output of said subtracting circuit.

8. A device as claimed in claim 7 including a counter for counting the number of operations of said restoring circuit.

* * * * *